(12) United States Patent
Geerits et al.

(10) Patent No.: US 8,107,316 B2
(45) Date of Patent: Jan. 31, 2012

(54) CONTROLLED SOURCE IMBALANCE APPARATUS, SYSTEMS, AND METHODS

(75) Inventors: Tim W. Geerits, Houston, TX (US); James R. Birchak, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 867 days.

(21) Appl. No.: 11/083,858

(22) Filed: Mar. 18, 2005

(65) Prior Publication Data
US 2006/0209635 A1    Sep. 21, 2006

(51) Int. Cl.
*G01V 1/00* (2006.01)
(52) U.S. Cl. ............................... 367/25; 367/28; 367/65
(58) Field of Classification Search .............. 367/25, 367/28, 65; 181/102, 104, 106; 33/1 HH
See application file for complete search history.

(56) References Cited

U.S. PATENT DOCUMENTS

| | | | | |
|---|---|---|---|---|
| 4,718,046 A | * | 1/1988 | Medlin | ........................... 367/31 |
| 4,855,963 A | | 8/1989 | Winbow et al. | |
| 5,081,391 A | * | 1/1992 | Owen | ............................. 367/75 |
| 5,644,186 A | | 7/1997 | Birchak et al. | |
| 6,135,234 A | * | 10/2000 | Harris et al. | .................... 367/25 |
| 6,401,538 B1 | | 6/2002 | Han et al. | |
| 6,412,354 B1 | | 7/2002 | Birchak et al. | |
| 6,568,486 B1 | * | 5/2003 | George | ........................... 175/45 |
| 6,619,394 B2 | | 9/2003 | Soliman et al. | |
| 6,631,327 B2 | * | 10/2003 | Hsu et al. | ........................... 702/6 |
| 6,661,737 B2 | | 12/2003 | Wisniewski et al. | |
| 6,671,224 B1 | * | 12/2003 | Pabon | ............................. 367/25 |
| 6,850,168 B2 | * | 2/2005 | Tang et al. | ....................... 367/25 |
| 6,985,086 B2 | * | 1/2006 | Tang et al. | ....................... 367/25 |
| 2003/0002388 A1 | * | 1/2003 | Mandal | ............................ 367/25 |

OTHER PUBLICATIONS

Byun, et al. "Effects of source mismatch on-multipole logging." 2004 ERL Consortium.*
Martin, Geoff. "The Significance of Interchannel Correlation, Phase, and Amplitude Differences on Multichannel Microphone Techniques." International Convention of the Audio Engineers Society, Oct. 2002.*
"U.S. Appl. No. 11/083,858, Final Office Action mailed Aug. 15, 2007", 19 pgs.
"U.S. Appl. No. 11/083,858, Non Final Office Action mailed Mar. 9, 2007", 16 pgs.
"U.S. Appl. No. 11/083,858, Non Final Office Action mailed Sep. 11, 2006", 9 pgs.
"U.S. Appl. No. 11/083,858, Restriction Requirement mailed May 22, 2006", 6 pgs.

* cited by examiner

*Primary Examiner* — Jack Keith
(74) *Attorney, Agent, or Firm* — Schwegman, Lundberg & Woessner, P.A.

(57) ABSTRACT

In some embodiments, an apparatus and a system, as well as a method and an article, may include exciting a plurality of signal source pairs having a substantially equal and non-zero acoustic signature amplitude difference in a frequency domain to provide acoustic signal data, and acquiring the acoustic signal data along a selected azimuth. The plurality of signal source pairs may comprise acoustic bender plates, perhaps included in the outer wall of a downhole tool.

26 Claims, 4 Drawing Sheets

US 8,107,316 B2

CONTROLLED SOURCE IMBALANCE APPARATUS, SYSTEMS, AND METHODS

TECHNICAL FIELD

Various embodiments described herein relate to information processing generally, including apparatus, systems, and methods for acquiring and processing acoustic signal information.

BACKGROUND INFORMATION

An acoustic logging tool may include one or more acoustic sources and a set of receivers that are spaced apart from each other. Acoustic signals may be transmitted by the acoustic sources and received at the receivers as the tool is drawn through a borehole. Thus, the acoustic signal from each source may travel through the formation adjacent the borehole to the receiver array, such that arrival times and other characteristics of the receiver response may be recorded. Received signals may include compressional wave (P-wave), shear wave (S-wave), and Stoneley waves. Received signal data may be processed to find formation characteristics, including slowness (the inverse of acoustic speed), from which pore pressure, porosity, and other formation property determinations can be made.

Traditional multipole acoustic tools use a set of sources that are as close to identical to each other as possible for generating various wave modes. Generally speaking, this practice is intended to reduce source-imbalance induced mode contamination that can operate to reduce array coherency of a particular desired mode. However, the usefulness of the measurements obtained may be reduced due to bandwidth limitations imposed by a matched set of sources.

DETAILED DESCRIPTION

Figures 1A, 1B:
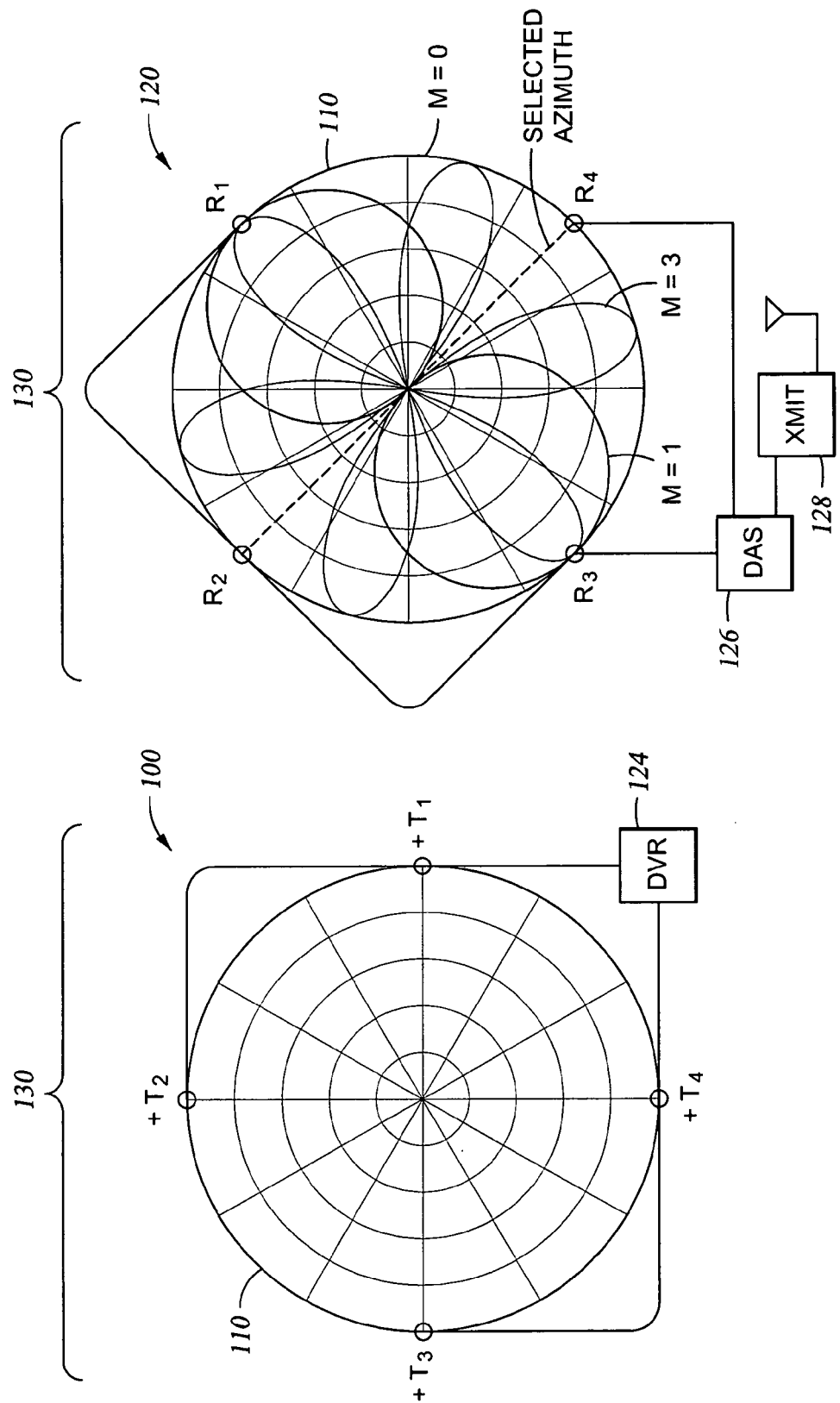
FIGS. 1A and 1B are radial coordinate diagrams locating a plurality of signal source pairs and receivers, respectively, along the perimeter of a substantially circular area according to various embodiments of the invention.

In borehole acoustic logging while drilling (LWD) and wireline measurements, multipole transmitters may be used to excite borehole guided modes (e.g., Stoneley, dipole, quadrupole, etc.). Typically, a multipole transmitter of order N is implemented using 2N piezoelectric crystals located on a circle having an inter-azimuthal spacing of about $\pi/N$ radians and alternating in sign (polarity), where N comprises a positive integer. The crystals may be mounted in the tool wall, such that each crystal can be excited in two ways: the thickness mode, and the flexural mode.

In the thickness mode, the crystal alternately expands and contracts omnidirectionally. In the flexural mode the crystal alternately bends inward and outward. Given certain conditions, the wavefield emitted by such sources can be modeled by assuming that each point on the surface of the crystal acts as a monopole (volume injection) point source or a point force source, depending on whether the crystal operates in the thickness or flexural mode, respectively. The total wavefield emitted by one source may then be represented as a continuous superposition of all such point source contributions. If the crystal has substantially the same curvature as the cylindrical tool wall, it can be shown (using the above mentioned superposition principle) that the azimuthal dependence of the wave field emitted by such a source is substantially identical to that of an equivalent point (volume injection/force) source centered on the surface of the cylindrically shaped crystal. Thus, in the mathematical description of a multipole source used for multipole acoustic logging (e.g., as used in LWD and wireline systems), the assumption may be made that piezoelectric crystals operating in the thickness/flexural mode can be modeled as point volume injection/force sources, with respect to the azimuthal dependence of the excited wavefield.

These types of effective behaviours can be obtained in many ways and are not necessarily restricted to implementation using piezoelectric crystals, as will be shown hereinbelow.

In some embodiments of the invention, the challenges described above may be addressed by the use of non-matched sources. That is, controlled source imbalances, with reception along a selected measurement azimuth, can be used to provide a bandwidth-enhanced measurement (e.g., relative to having all sources matched).

The multipole monopole measurement may be used as an example. Introducing a plurality of signal source pairs having a substantially equal and non-zero acoustic signature amplitude differences in the frequency domain (e.g., where the sum of and the difference between diametrically opposed source signatures is substantially constant) enables an increased bandwidth monopole (e.g., Stoneley wave) measurement. In the case of N=2, (axial) receiver array data may be acquired at azimuths of $3\pi/4$ and $3\pi/4\pm\pi$ radians. These azimuth values may be chosen in order to minimize source imbalance induced mode contamination. Thus, in the multipole acoustic LWD monopole measurement, pairwise matched sources, as opposed to individually matched sources, may be used to obtain array measurements having an increased bandwidth.

FIGS. 1A and 1B are radial coordinate diagrams locating a plurality of signal source pairs and receivers, respectively, along the perimeter of a substantially circular area according to various embodiments of the invention, each of which may operate in the manner described.

In FIG. 1A a transmitter 100 of order N is depicted as a collection of 2N (e.g., N=2 in the figure) point sources T1, T2, T3, and T4, located periodically on a circle 110 of radius R. FIG. 1B shows a receiver section 120, including receivers R1, R2, R3, and R4, located along the same circle 110. For example, the circle 110 may comprise the outer wall of a downhole tool, such as a multipole LWD (e.g., wireline) acoustic logging tool.

In the most general case, where none of the multipole sources are matched, the acoustic pressure at an arbitrary position in the borehole fluid is an infinite weighted superposition of modal pressure contributions. The weight assigned to each modal contribution may be a linear combination of the source signatures that apply to each of the sources T1-T4 and the azimuthal location of the measurement point. Consequently, if the source signatures that make up a particular modal weight cancel, that particular mode vanishes.

Consider the case where N=2, and assume that all source signature spectra assigned to T1-T4, say, $t_1$, $t_2$, $t_3$, $t_4$, are substantially identical, as might occur when the transmitters T1-T4 are individually (amplitude and phase) matched. The non vanishing modes are then M=0 (monopole), M=4 (octopole), M=8 ( . . . ), etc. With respect to source signatures, all modes carry the same (spectral) weight: $2(\hat{t}_1+\hat{t}_3)$, or $\hat{t}_1+\hat{t}_2+\hat{t}_3+\hat{t}_4$, since $\hat{t}_1=\hat{t}_2=\hat{t}_3=\hat{t}_4$. Therefore, the monopole (Stoneley wave) measured spectral amplitude can be stated as: $2(\hat{t}_1+\hat{t}_3)'\hat{c}_0$, where $\hat{c}_0$ is the monopole spectral response function.

Now, consider the case where N=2, and assume pairwise matched transmitters, as may be included in various embodiments. That is, consider source imbalances that are controlled so that a plurality of signal source pairs have a substantially equal and non-zero acoustic signature spectral amplitude difference. In this scenario, the sum of and difference between diametrically opposed transmitter signatures is substantially constant. That is:

$$\hat{t}_j \pm \hat{t}_{n+j} = C_{\pm} (j=1,2,K,n).$$

Thus, the source signatures of diametrically opposed transmitters $\hat{t}_j$ and $\hat{t}_{n+j}$ can be different. For the example, where N=2, this means:

$$\hat{t}_1+\hat{t}_3=\hat{t}_2+\hat{t}_4=C_+ \text{ and } \hat{t}_1-\hat{t}_3=\hat{t}_2-\hat{t}_4=C_-.$$

In FIG. 1B, the modal directivity patterns and accompanying (maximum) weights of the first three non vanishing modal contributions (i.e., M=0 (monopole), M=1 (dipole), and M=3 (hexapole)) are shown: $2(\hat{t}_1+\hat{t}_3)$ for the monopole ($\hat{c}_0$), $2(\hat{t}_1-\hat{t}_3)$ for the dipole ($\hat{c}_1$) and $2\sqrt{2}(\hat{t}_1-\hat{t}_3)$ for the hexapole ($\hat{c}_3$). The latter two modes (dipole and hexapole) are source imbalance induced and are not usually desired. Thus, if receivers R1, R3 are placed at the azimuthal locations $$\hat{R}_2\left(\frac{3}{4}\pi\right), \hat{R}_4\left(-\frac{1}{4}\pi\right),$$

only the monopole wavefield (e.g., the Stoneley mode) is observed, since the source imbalance induced dipole and hexapole modes tend to vanish at these azimuths. The next modal contribution comes from the octopole mode (not shown in figure), which has a rather high cutoff frequency of about seven kHz. Consequently, the most useful monopole data may be obtained at these azimuths at frequencies below about seven kHz.

If pairwise matched transmitters are used, however, the source signatures $\hat{T}_1(\omega)$ and $\hat{T}_3(\omega)$ can be chosen independently (as opposed to the use of individually matched transmitters), so that increased bandwidth Stoneley wave measurements can be obtained by driving both transmitters at slightly different frequencies. For example $\hat{t}_1$ may be chosen to have a center frequency of about one kHz, while $\hat{t}_3$ has a center frequency of about 1.5 kHz. To minimize the amplitudes of the source imbalance induced modes one could make $\hat{t}_3$ substantially identical to $\hat{t}_1$, (with respect to amplitude), and uniformly shifted in frequency content by an amount of about 0.5 kHz. Note that in this example the two crossline measurements may not be very useful. Thus, in some embodiments, a plurality of receivers R1-R4 may be located to receive signals provided by a plurality of signal source pairs T1, T3 and T2, T4 located at a spacing of approximately $\pi/N$ radians along a substantially circular curve (e.g., circle 110, which may comprise a portion of a downhole tool outer wall), such that N comprises an excitation order and a positive integer.

In some embodiments, driver circuitry 124 may be coupled to the plurality of signal source pairs T1, T3 and T2, T4 to provide independent drive for individual source elements T1, T2, T3, and T4 included in the plurality of signal source pairs T1, T3 and T2, T4. The independent drive may comprise a programmable drive, as shown in U.S. Pat. No. 6,661,737, assigned to Halliburton Energy Services, Inc. and incorporated herein by reference in its entirety. Use of the driver circuitry 124 may enable substantially simultaneous excitement of the plurality of signal source pairs T1, T3 and T2, T4, as well as substantially simultaneous excitement of the individual source elements T1, T2, T3, and T4. The resulting arrangement of pairwise matched transmitters T1-T4 (e.g., the plurality of signal source pairs T1, T3 and T2, T4) can be used in many applications.

In some embodiments, a data acquisition system 126 may be coupled to the plurality of receivers R1-R4 to receive signals generated by the plurality of signal source pairs T1, T3 and T2, T4. A telemetry transmitter 128 may be coupled to the plurality of receivers R1-R4 and/or the data acquisition system 126, perhaps being used to communicate the received signals, or some data derived from the signals, to a remote location, such as a remote collection station or storage medium. Thus, the transmitter 100, receiver section 120, data acquisition system 126, and the telemetry transmitter 128 may each comprise a portion of an apparatus 130. Other embodiments may be realized.

Figure 2:
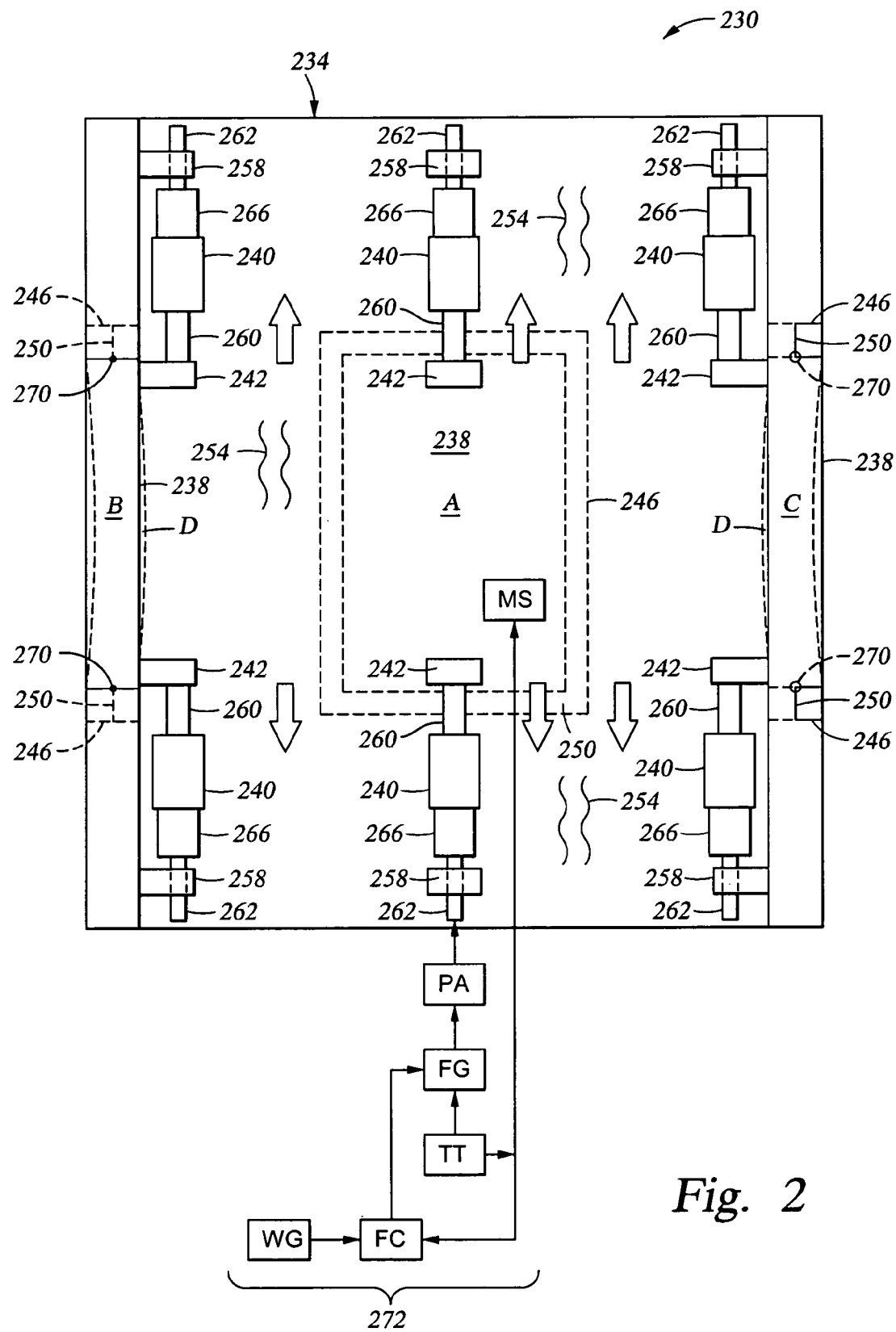
FIG. 2 is a side, cut-away view of an apparatus according to various embodiments of the invention.

For example, FIG. 2 is a side, cut-away view of an apparatus 230 according to various embodiments of the invention. It should be noted that while piezoelectric crystals may be used as both transmitters and receivers according to the teachings of this disclosure, they also generate a relatively small output, sometimes too small to excite strong and coherent signals (e.g., downhole formation signals) for detection by the receivers (see FIG. 1B, elements R1=R4). Thus, the use of bender plate sources is presented herein, where the potential exists to generate acoustic field displacements much larger than those provided by a piezoelectric transmitter embodiment.

A pipe 234 (e.g., a housing, such as a drill collar, downhole tool, or tool body) can be modified to include one or more bender plates 238. A multipole monopole implementation is shown; however, more bender plates 238 (and different polarities of bender plates 238) may be incorporated to excite higher modes. When cyclic driving forces are applied by the actuators 240 (e.g., electromechanical or hydraulic) to the attached moment arms 242, the moment arms 242 can move 'INWARD' (compression of the moment arms 242) and 'OUTWARD' (expansion of the moment arms 242, shown by arrows in the figure) causing the bender plate to deflect 'OUTWARD' and 'INWARD' (shown in the figure as displacement D), respectively.

The bender plates 238 may be constructed in a number of ways. For example, a channel 246 may be constructed on two or more sides of each plate 238. In some embodiments, the channel 246 may surround the bender plate 238 to give moment arms 242 additional degrees of movement freedom, perhaps increasing the curvature of the bender plates 238 when they are deflected. The curvature can determine the effective source behavior of the bender plates 238 (e.g., monopole or dipole, as mentioned previously). The floor 250 of the channels 246 should be thick enough to withstand side forces incurred during deployment downhole, as well as to avoid movement of static plates (e.g., Plate A) when other plates are being fired (e.g., Plates B and C). On the other hand, transmission of pressure through the use of pressure-balance fluid 254, perhaps adjacent the bender plates 238, can cause unwanted movement if the channel floor 250 is too thin. Thus, in some embodiments, the pressure balance fluid 254 should be more compressible than borehole fluids. For example, Dow Corning DC200 Silicone Oil Fluids, available from the Crescent Chemical Company, Inc. of Islandia, N.Y., and other fluids having relatively low viscosity with relatively high compressibility (e.g., fluids containing polydimethylsiloxane), may be used. When configured as shown, the moment arms 242 in combination with the elastic properties of the bender plates 238 and the channels 246 can generate a monopole source, for example, with bender plate displacements D much larger than those that occur in a piezoelectric embodiment.

A number of different actuators 240 (e.g., piezoelectric, magnetostrictive, or electromagnetic) may be used to move the moment arms 242. For example, electromagnetic actuators 240 are shown in FIG. 2. Here the actuators 240 are coupled to the moment arms 242 and restraining brackets 258 to restrain backing forces by the actuators 240. The actuators 240 may be coupled to the moment arms 242 with push rods 260. The restraining brackets 258 may be attached to actuator preload bolts 262. A backing mass 266 may be attached to the actuators 240. Note that the actuator 240 implementation allows for driving the bender plates 238 independently of each other, permitting controlled source imbalance excitation. For example, a monopole excitation can be implemented using bender plates having the same polarity (e.g., plates A, B, and C, as well as the matched pair plate for plate A all have a positive polarity, or all have a negative polarity). A quadrupole excitation can be implemented using bender plates 238 having polarities of alternating in sign. Thus when plate A (e.g., T2) and its matched pair plate (not shown) has a positive polarity, plates B and C (e.g., T1 and T3) will have a negative polarity, and vice versa.

Referring now to FIGS. 1A, 1B, and 2, it can be seen that a number of embodiments may be realized. For example, an apparatus 230 may comprise a plurality of signal source pairs T1, T3 and T2, T4 (e.g., corresponding to plates B, C, and A, for example, with no plate corresponding to signal source T4 shown in FIG. 2) having a substantially equal and non-zero acoustic signature amplitude difference in the frequency domain. The non-zero acoustic signature amplitude difference may include a balanced phase. The plurality of signal source pairs T1, T3 and T2, T4 may comprise substantially diametrically opposed individual source elements T1, T2, T3, and T4, and the individual source elements T1, T2, T3, and T4 may be located along the perimeter of a substantially circular area 110.

In some embodiments of the apparatus 230, the plurality of signal source pairs T1, T3 and T2, T4 may comprise piezoelectric crystals, as well as acoustic bender plates 238, which may in turn be coupled to actuators 240, such as electromechanical actuators, perhaps using moment arms 242. Two or more sides of the acoustic bender plates 238 may be defined by substantially matched channels 246 (e.g., plates B and C), as well as by a substantially continuous channel 246 (e.g., plate A).

In some cases the channel 246 is cut completely through the wall of the pipe 234 (e.g., there is no floor 250), and the acoustic bender plates 238 may be sealingly coupled to a retaining wall structure, such as the pipe 234 using a seal 270. Coupling various structures using a seal 270 in a pressure compensated environment is known to those of skill in the art, as illustrated in U.S. Pat. No. 6,661,737, assigned to the Halliburton Company and incorporated herein by reference in its entirety.

In order to control the composition of the effective source signature (i.e., its total time duration and frequency content) for each of the bender plates 238, it may be useful to have a feedback system 272 implemented by which, via an iterative process, desired temporal plate motion can be obtained. Such a system 272 may form a portion of the programmable drive mechanism described above. For example, a pre-programmed waveform may be provided by a waveform generator WG to a feedback and control processor FC. A pulse with trigger may be initiated by a trigger-timer generator TT to update a function generator FG, based on feedback and control output from a feedback control processor FC. The output of the function generator FG may be fed to a power amplifier PA, such as a broadband power amplifier, and the output of the power amplifier PA may be provided to one or more bender plates 238, or other transducers. A motion sensor MS (e.g., an accelerometer) may be attached to or otherwise sense the movement of the bender plate 238, and its output may be used to modify the behaviour of the feedback and control processor FC.

Figure 3:
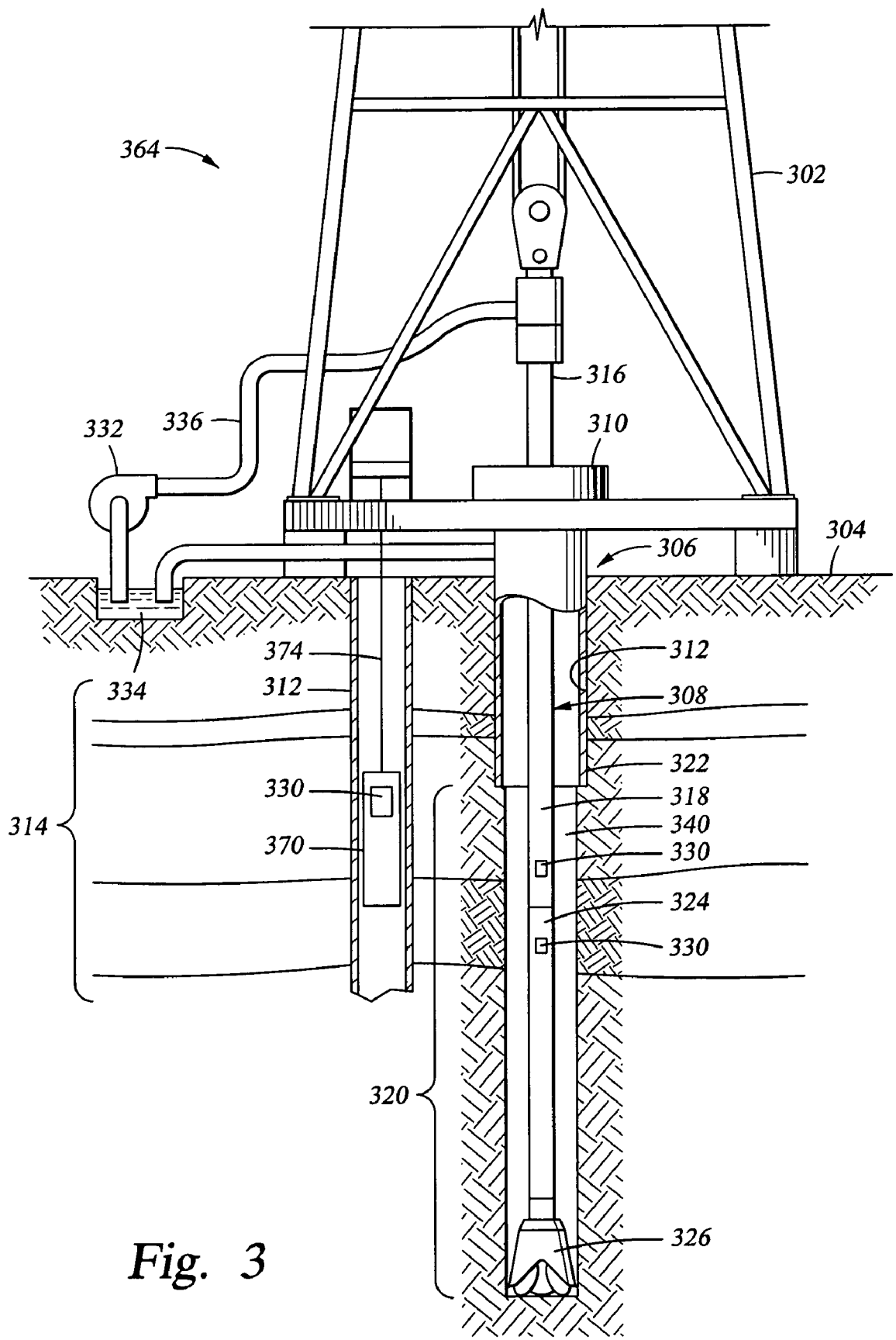
FIG. 3 is an illustration of apparatus and systems according to various embodiments of the invention.

FIG. 3 is an illustration of apparatus 330 and systems 364 according to various embodiments, which may comprise portions of a downhole tool 324 as part of a downhole drilling operation, or a tool body 370 as part of a logging operation. Thus, in some embodiments, a system 364 may form a portion of a drilling rig 302 located at a surface 304 of a well 306. The drilling rig 302 may provide support for a drill string 308. The drill string 308 may operate to penetrate a rotary table 310 for drilling a borehole 312 through subsurface formations 314. The drill string 308 may include a Kelly 316, drill pipe 318, and a bottom hole assembly 320, perhaps located at the lower portion of the drill pipe 318.

The bottom hole assembly 320 may include drill collars 322, a downhole tool 324, and a drill bit 326. The drill bit 326 may operate to create a borehole 312 by penetrating the surface 304 and subsurface formations 314. The downhole tool 324 may comprise any of a number of different types of tools including MWD (measurement while drilling) tools, LWD (logging while drilling) tools, and others.

During drilling operations, the drill string 308 (perhaps including the Kelly 316, the drill pipe 318, and the bottom hole assembly 320) may be rotated by the rotary table 310. In addition to, or alternatively, the bottom hole assembly 320 may also be rotated by a motor (e.g., a mud motor) that is located downhole. The drill collars 322 may be used to add weight to the drill bit 326. The drill collars 322 also may stiffen the bottom hole assembly 320 to allow the bottom hole assembly 320 to transfer the added weight to the drill bit 326, and in turn, assist the drill bit 326 in penetrating the surface 304 and subsurface formations 314.

During drilling operations, a mud pump 332 may pump drilling fluid (sometimes known by those of skill in the art as "drilling mud") from a mud pit 334 through a hose 336 into the drill pipe 318 and down to the drill bit 326. The drilling fluid can flow out from the drill bit 326 and be returned to the surface 304 through an annular area 340 between the drill pipe 318 and the sides of the borehole 312. The drilling fluid may then be returned to the mud pit 334, where such fluid is filtered. In some embodiments, the drilling fluid can be used to cool the drill bit 326, as well as to provide lubrication for the drill bit 326 during drilling operations. Additionally, the drilling fluid may be used to remove subsurface formation 314 cuttings created by operating the drill bit 326.

Thus, referring now to FIGS. 1, 2, and 3, it may be seen that in some embodiments, the system 364 may include a drill collar 322, a downhole tool 324, and/or a tool body 370 to house one or more apparatus 330, similar to or identical to the apparatus 130, 230 described above and illustrated in FIGS. 1 and 2. Thus, for the purposes of this document, the term "housing" may include any one or more of a drill collar 322, a downhole tool 324, and a tool body 370. The downhole tool 324 may comprise an LWD tool and an MWD tool. The tool body 370 may comprise a wireline logging tool, for example, coupled to a logging cable 374.

The transmitter 100; circle 110; receiver section 120; driver circuitry 124; data acquisition system 126; telemetry transmitter 128; apparatus 130, 230, 330; pipe 234; bender plates 238, A, B, C; actuators 240; moment arms 242; channels 246; floor 250; pressure-balance fluid 254; restraining brackets 258; push rods 260; preload bolts 262; backing mass 266; seal 270; feedback system 272; drilling rig 302; surface 304; well 306; drill string 308; rotary table 310; borehole 312; subsurface formations 314; Kelly 316; drill pipe 318; bottom hole assembly 320; drill collars 322; downhole tool 324; drill bit 326; mud pump 332; mud pit 334; hose 336; annular area 340; system 364; tool body 370; logging cable 374; feedback and control processor FC; function generator FG; motion sensor MS; power amplifier PA; receivers R1, R2, R3, and R4; sources T1, T2, T3, and T4; trigger-timer generator TT; and waveform generator WG may all be characterized as "modules" herein. Such modules may include hardware circuitry, and/or a processor and/or memory circuits, software program modules and objects, and/or firmware, and combinations thereof, as desired by the architect of the apparatus 130, 230, 330 and systems 364, and as appropriate for particular implementations of various embodiments. For example, in some embodiments, such modules may be included in an apparatus and/or system operation simulation package, such as a software electrical signal simulation package, a power usage and distribution simulation package, a capacitance-inductance simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 130, 230, 330 and systems 364 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, voltage references for geothermal tools and smart transducer interface node telemetry systems, among others. Some embodiments include a number of methods.

Figure 4:
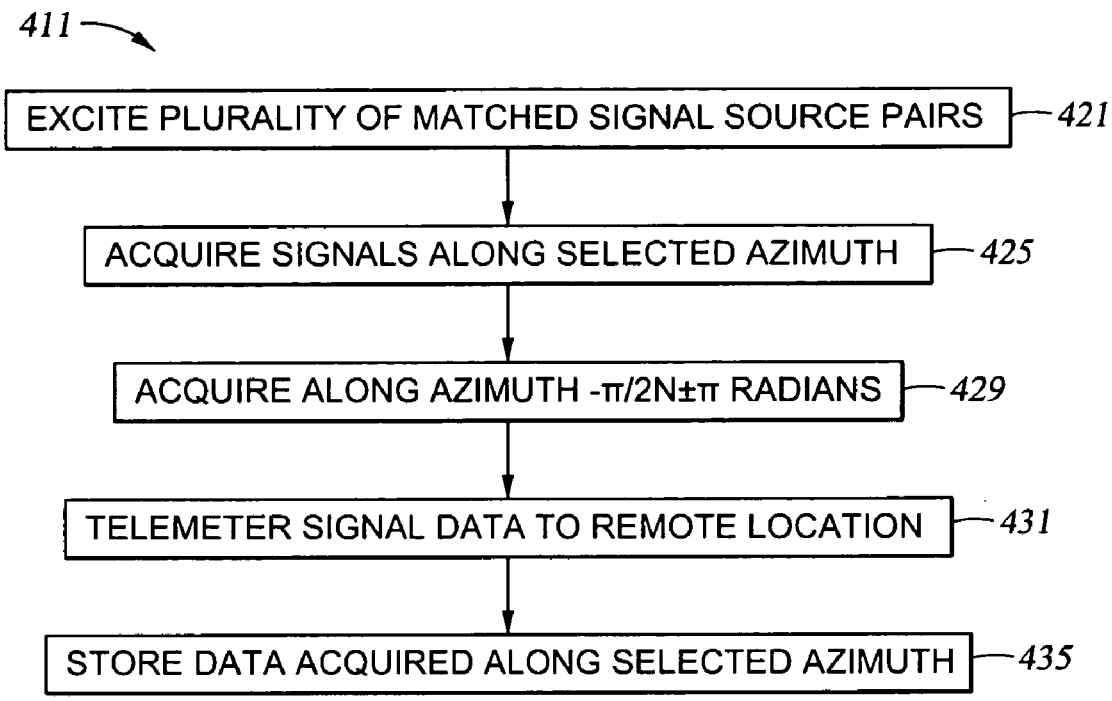
FIG. 4 is a flow chart illustrating several methods according to various embodiments.

For example, FIG. 4 is a flow chart illustrating several methods 411 according to various embodiments. In some embodiments of the invention, a method 411 may (optionally) begin at block 421 with exciting a plurality of signal source pairs (having a substantially equal and non-zero acoustic signature amplitude difference in the frequency domain) to provide acoustic signal data. The plurality of signal source pairs may be substantially phase imbalanced, or substantially phase balanced. The polarity of the plurality of signal source pairs may be the same or alternating, and selected from either a positive polarity or a negative polarity (e.g., for a monopole embodiment or quadrapole embodiment, respectively). The plurality of signal source pairs may be located at a spacing of approximately $\pi/N$ radians along a substantially circular curve, such that N comprises an excitation order and a positive integer, as noted previously.

The method 411 may comprise acquiring the acoustic signal data along a selected azimuth at block 425, including acquiring the acoustic signal data along azimuthal locations of $-\pi/2N \pm \pi$ radians, such that N comprises a positive integer, at block 429.

In some embodiments, the method 411 may include telemetering the acoustic signal data to a remote location, such as a collection station or storage medium, at block 431. Thus, the method 411 may include storing (either remotely or locally) the acoustic signal data acquired along a selected azimuth at block 435.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 5:
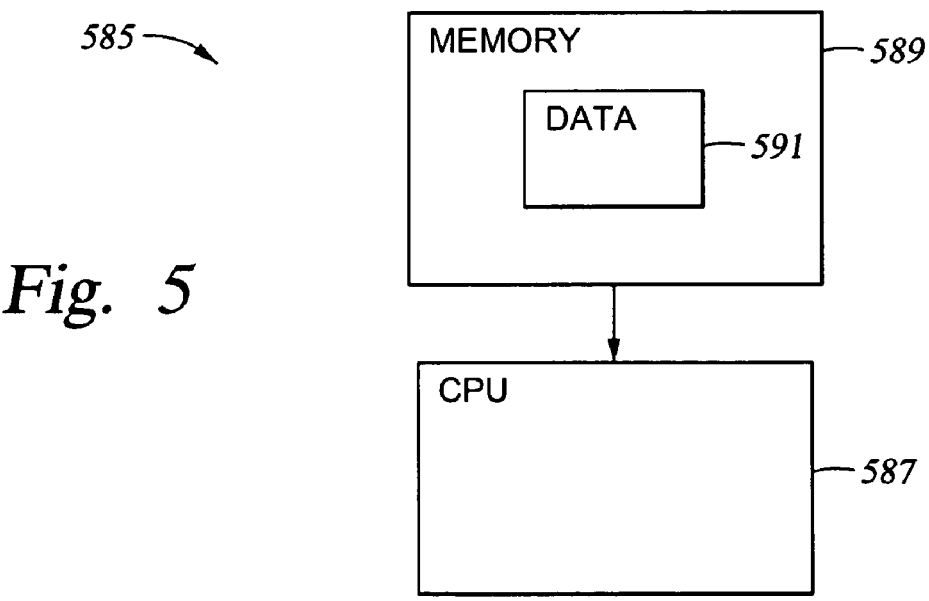
FIG. 5 is a block diagram of an article according to various embodiments of the invention.

FIG. 5 is a block diagram of an article 585 according to various embodiments, such as a computer, a memory system, a magnetic or optical disk, some other storage device, and/or any type of electronic device or system. The article 585 may include a processor 587 coupled to a machine-accessible medium such as a memory 589 (e.g., removable storage media, as well as any memory including an electrical, optical, or electromagnetic conductor) having associated information 591 (e.g., computer program instructions and/or data), which when accessed, results in a machine (e.g., the processor 587) performing such actions as exciting a plurality of signal source pairs (having a substantially equal and non-zero acoustic signature amplitude difference in the frequency domain) to provide acoustic signal data, and storing the acoustic signal data acquired along a selected azimuth.

Other actions may include acquiring the acoustic signal data along a selected azimuth comprising azimuthal locations of $-\pi/2N\pi$ radians, such that N comprises a positive integer. Further actions may include, telemetering the acoustic signal data to a remote collection station.

Using the apparatus, systems, and methods disclosed herein may provide increased bandwidth and an improved signal to noise ratio for acquired acoustic signal information. This functionality may be especially useful with respect to acoustic formation signals acquired in downhole environments.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a plurality of signal source pairs comprising substantially diametrically opposed individual source elements; and
   driver circuitry coupled to the plurality of signal source pairs to provide independent drive and a controllable, substantially equal and non-zero acoustic signature amplitude difference between the substantially diametrically opposed individual source elements in a frequency domain.

2. The apparatus of claim 1, wherein the individual source elements are located along a perimeter of a substantially circular area.

3. The apparatus of claim 1, wherein the plurality of signal source pairs comprise acoustic bender plates.

4. The apparatus of claim 3, wherein the acoustic bender plates are coupled to electromechanical actuators.

5. The apparatus of claim 4, wherein the acoustic bender plates are coupled to the electromechanical actuators via moment arms.

6. The apparatus of claim 3, wherein the acoustic bender plates are sealingly coupled to a retaining wall structure.

7. The apparatus of claim 3, wherein at least two sides of the acoustic bender plates are defined by substantially matched channels.

8. The apparatus of claim 3, wherein the acoustic bender plates are defined by a substantially continuous channel.

9. The apparatus of claim 1, wherein the plurality of signal source pairs comprise piezo crystals.

10. The apparatus of claim 1, wherein the driver circuitry comprises a programmable drive.

11. The apparatus of claim 1, wherein the non-zero acoustic signature amplitude difference includes a balanced phase.

12. The apparatus of claim 1, wherein individual source elements included in the plurality of signal source pairs are substantially simultaneously excited.

13. A system, comprising:
   a housing having an outer wall, wherein the housing is selected from one of a drill collar, a downhole tool, and a tool body;
   a plurality of signal source pairs comprising substantially diametrically opposed individual source elements, wherein the plurality of signal source pairs comprise acoustic bender plates included in the outer wall; and
   driver circuitry coupled to the plurality of signal source pairs to provide independent drive and a controllable, substantially equal and non-zero acoustic signature amplitude difference between the substantially diametrically opposed individual source elements in a frequency domain.

14. The system of claim 13, further comprising:
   a plurality of receivers located to receive signals provided by the plurality of signal source pairs, wherein the plurality of signal source pairs are located at a spacing of approximately $\pi/N$ radians along a substantially circular curve of the outer wall, and wherein N comprises an excitation order and a positive integer.

15. The system of claim 13, wherein the individual source elements are located along a perimeter of a substantially circular area.

16. The system of claim 13, wherein the independent drive comprises a programmable drive.

17. The system of claim 13, wherein the downhole tool is selected from one of a logging while drilling tool and a measurement while drilling tool.

18. The system of claim 13, further comprising:
   a data acquisition system coupled to a plurality of receivers to receive signals generated by the plurality of signal source pairs.

19. The system of claim 13, further comprising:
   a telemetry transmitter coupled to a plurality of receivers to receive signals generated by the plurality of signal source pairs.

20. The system of claim 13, wherein at least two sides of the acoustic bender plates are defined by substantially matched channels.

21. The system of claim 13, further comprising:
   a compressible fluid adjacent the acoustic bender plates.

22. The system of claim 13, wherein the acoustic bender plates are coupled to electromechanical actuators.

23. The system of claim 22, wherein the acoustic bender plates are coupled to the electromechanical actuators via moment arms.

24. The system of claim 13, wherein the acoustic bender plates are sealingly coupled to the outer wall.

25. The system of claim 24, further comprising:
   a compressible fluid adjacent the acoustic bender plates.

26. The system of claim 13, wherein the acoustic bender plates are defined by a substantially continuous channel.

* * * * *